Patented May 15, 1923.

1,455,264

UNITED STATES PATENT OFFICE.

ERNST PREISWERK, OF BASEL, SWITZERLAND, ASSIGNOR TO THE HOFFMANN-LA ROCHE CHEMICAL WORKS, OF NEW YORK, N. Y., A CORPORATION OF NEW YORK.

EASILY AND NEUTRALLY SOLUBLE DOUBLE COMPOUNDS OF 1-ALLYL-3.7-DIMETHYL-XANTHINE.

No Drawing.   Application filed Jnue 9, 1921.  Serial No. 476,307.

*To all whom it may concern:*

Be it known that I, ERNST PREISWERK, a citizen of Switzerland, and a resident of Basel, Switzerland, have invented certain new and useful Easily and Neutrally Soluble Double Compounds of 1-Allyl-3.7-Dimethylxanthine, of which the following is a specification.

My invention relates to easily and neutrally soluble double compounds of 1-allyl-3.7-dimethylxanthine which may be produced by allowing at least 2 molecules of an alkali salt of the benzol-carbonic acids to act upon 1 molecule of 1-allyl-3.7-dimethylxanthine.

It is known that 1-3-7-trimethylxanthine and the alkali salts of benzoic and salicylic acid form easily soluble compounds containing the two components in molecular proportions (Hager, Handbuch der Pharmaceutischen Praxis, 1913, vol. 1, page 912). The manufacture of easily soluble double compounds of 1-ethyl-3.7-dimethylxanthine with the alkali salts of benzoic and salicylic acid in molecular proportions is described in the German Patent No. 170302. By replacing the methyl or ethyl radical by the allyl group the character of the compound is so materially altered that it is not possible to obtain an easily soluble product by the treatment with an alkali salt of the benzoic or salicylic acid in molecular proportions. It was however desirable that 1-allyl-3.7-dimethylxanthine should be rendered soluble in water in order to make it suitable for injections.

It has been found that easily and neutrally soluble double compounds of 1-allyl-3.7-dimethylxanthine may be obtained by allowing at least 2 molecules of an alkali salt of the benzol-carbonic acids to act upon 1 molecule of 1-allyl-3.7-dimethylxanthine. The new double compounds are best obtained by evaporating the solutions in vacuo. These compounds are easily soluble in water, particularly in warm water. Their dilute aqueous solution reacts neutrally and is not altered by the addition of alkali. The addition of mineral acids to moderately dilute solutions of these compounds produces a white crystalline precipitate. Upon intense heating these compounds leave a solid residue of alkaline reaction. It is thus possible to obtain a diuretic of the qualities of theobromine, which at the same time has the analeptic properties of caffeine, in neutral aqueous solution and of a concentration suitable for injection.

The new compounds are to be use in therapy owing to their excellent diuretic and analeptic properties.

*Example 1.*

22 parts of 1-allyl-3.7-dimethylxanthine and 33 parts of sodium salicylate are dissolved in 110 parts of water. After evaporation in vacuo 30 per cent solutions may easily be obtained from the remaining compound. Even when left standing for some time in a normal temperature no crystals separate from these solutions.

*Example 2.*

22 parts of 1-allyl-3.7-dimethylxanthine and 39 parts of lithium benzoate are dissolved in 220 parts of warm water and the solution is evaporated in vacuo. On being taken up in water the compound thus obtained yields stable, neutral solutions.

*Example 3.*

22 parts of 1-allyl-3.7-dimethylxanthine and 58 parts of sodium benzoate are dissolved in 220 parts of water. On being evaporated in vacuo the clear solution leaves a white crystalline residue from which at normal temperature 10 and higher per cent neutrally reacting, aqueous solutions may easily be obtained.

*Example 4.*

22 parts of 1-allyl-3.7-dimethylxanthine and 33 parts of sodium salicylate are dissolved in 110 parts of warm water. By heating the solution may be rendered sterile and suitable for injections.

While I have described and claim a process for manufacturing the newly discovered compounds, I desire it to be understood that I claim such compounds by whatever process they may be produced and do not limit my claims to such compounds only when produced by such process.

I claim:

1. As new products the double compounds of 1-allyl-3.7-dimethylxanthine which may be produced by allowing at least two molecules of an alkali salt of a benzol-carbonic acid to act upon one molecule of 1-allyl-3.7-dimethylxanthine, such products being easily soluble in water, particularly in warm water, their dilute aqueous solutions reacting neutrally and being unaltered by the addition of alkali, the addition of mineral acids to moderately dilute solutions of these products producing a white crystalline precipitate and such products, upon intense heating, leaving a solid residue of alkaline reaction.

2. As new products the double compounds of 1-allyl-3.7-dimethylxanthine which may be produced by allowing at least two molecules of an alkali salt of benzoic acid to act upon one molecule of 1-allyl-3.7-dimethylxanthine, such products being easily soluble in water, particularly in warm water, their dilute aqueous solutions reacting neutrally and being unaltered by the addition of alkali, the addition of mineral acids to moderately dilute solutions of these products producing a white crystalline precipitate and such products, upon intense heating, leaving a solid residue of alkaline reaction.

3. The process for the manufacture of double compounds of 1-allyl-3.7-dimethylxanthine which consists in allowing at least 2 molecules of an alkali salt of a benzolcarbonic acid to act upon 1 molecule of 1-allyl-3.7-dimethylxanthine.

4. The process for the manufacture of double compounds of 1-allyl-3.7-dimethylxanthine which consists in allowing at least 2 molecules of an alkali salt of benzoic acid to act upon 1 molecule of 1-allyl-3.7-dimethylxanthine.

In witness whereof I have hereunto set my hand.

ERNST PREISWERK.

Witnesses:
ALBERT ALFRED HOFFMANN,
HENRY KUBLI.